US012761993B2

(12) United States Patent
Iyer et al.

(10) Patent No.: US 12,761,993 B2
(45) Date of Patent: Oct. 13, 2026

(54) SYSTEM AND METHOD FOR EVALUATING THE OPERATIONAL AGE OF DATA CENTER EQUIPMENT

(71) Applicant: Dell Products L.P., Round Rock, TX (US)

(72) Inventors: Pushkala Iyer, Round Rock, TX (US); Lori L. Matthews, Austin, TX (US); Rekha Poosala, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 200 days.

(21) Appl. No.: 18/651,085

(22) Filed: Apr. 30, 2024

(65) Prior Publication Data

US 2025/0335277 A1 Oct. 30, 2025

(51) Int. Cl.
*G06F 11/00* (2006.01)

(52) U.S. Cl.
CPC .................................. *G06F 11/008* (2013.01)

(58) Field of Classification Search
CPC ..................................................... G06F 11/008
See application file for complete search history.

(56) References Cited

U.S. PATENT DOCUMENTS 6,829,515 B2 * 12/2004 Grimm .................... G07C 3/00 700/170
10,261,875 B2 * 4/2019 Anderson ............. G06F 9/4893
2025/0216846 A1 * 7/2025 Liu .................... G05B 23/0283

* cited by examiner

*Primary Examiner* — Amine Riad
(74) *Attorney, Agent, or Firm* — Fogarty LLP

(57) ABSTRACT

Systems and methods for evaluating the effective age of an IHS are disclosed. An example method comprises determining an operational age of the IHS. The method further includes determining a workload factor representing an intensity level for workloads run on the IHS, determining a maintenance factor representing currency of firmware and driver updates for the IHS, determining a history factor representing issues observed as impacting the IHS, impacting hardware on similar IHS models, or impacting software on the IHS, and determining a support factor representing currency of warranties for the IHS and related hardware. The method then calculates a real age of the IHS based upon the operational age, the workload factor, the maintenance factor, the history factor, and the support factor. The method further comprises calculating a performant age of the IHS based upon a refresh cycle duration and the real age.

20 Claims, 4 Drawing Sheets

SYSTEM AND METHOD FOR EVALUATING THE OPERATIONAL AGE OF DATA CENTER EQUIPMENT

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as servers that are stacked and installed within racks. A data center may include large numbers of such server racks that are organized into rows. Administration of such large groups of IHSs require administrators that support availability of the data center operations while minimizing downtime. The individual IHSs in a data center gradually grow older in terms of both chronological age (i.e., elapsed time since first install) and operational age (i.e., cumulative runtime or uptime).

SUMMARY

Embodiments are directed to systems and methods for evaluating the effective age of an IHS (Information Handling System). An example embodiment of the method comprises determining an operational age of the IHS. The operational age corresponds to a cumulative length of time when the IHS was powered on and not in an idle state. The method further includes determining a workload factor representing an intensity level for workloads run on the IHS, determining a maintenance factor representing currency of firmware and driver updates for the IHS, determining a history factor representing issues observed as impacting the IHS, impacting hardware on similar IHS models, or impacting software on the IHS, and determining a support factor representing currency of warranties for the IHS and related hardware. The method then calculates a real age of the IHS based upon the operational age, the workload factor, the maintenance factor, the history factor, and the support factor. The method further comprises calculating a performant age of the IHS based upon a refresh cycle duration and the real age.

The real age may be calculated using the formula: Real Age=(0.75*Operational Age)+(0.10*Workload Factor*Operational Age)+(0.05*Maintenance Factor*Operational Age)+(0.05*History Factor*Operational Age)+(0.05*Support Factor*Operational Age).

The workload factor may further represent a type of workloads running on the IHS and an impact of the workloads on cooling requirements for the IHS. The maintenance factor may further represent a quality of a parts replacement system for the IHS.

A generic version of the real age calculation formula is: Real Age=(W1*Operational Age)+(W2*Workload Factor*Operational Age)+(W3*Maintenance Factor*Operational Age)+(W4*History Factor*Operational Age)+(W5*Support Factor*Operational Age), wherein W1, W2, W3, W4, and W5 are weightages set by a user or selected by a user from a predetermined range.

The performant age may be calculated using the formula: Performant Age=Refresh Cycle Duration−Real Age.

The method may further comprise displaying a visual indication of performant age on the physical IHS. The visual indication of performant age may be a light on a panel of a server. The visual indication of performant age may be displayed on a management console user interface. The method may further comprise generating a report identifying a chronological age and the performant age for each of a group of servers.

In one embodiment, an Information Handling System (IHS) comprises computer-readable instructions stored in at least one memory and executed by at least one processor. The computer-readable instructions cause the processor to: monitor an operational age of the IHS, the operational age corresponding to a cumulative length of time when the IHS was powered on and not in an idle state; monitor a workload factor representing an intensity level for workloads run on the IHS; monitor a maintenance factor representing currency of firmware and driver updates for the IHS; determine a history factor representing issues observed as impacting the IHS, impacting hardware on similar IHS models, or impacting software on the IHS; determine a support factor representing currency of warranties for the IHS and related hardware; calculate a real age of the IHS based upon the operational age, the workload factor, the maintenance factor, the history factor, and the support factor; and calculate a performant age of the IHS based upon a refresh cycle duration and the real age.

The IHS may calculate real age using the formula: Real Age=(W1*Operational Age)+(W2*Workload Factor*Operational Age)+(W3*Maintenance Factor*Operational Age)+(W4*History Factor*Operational Age)+(W5*Support Factor*Operational Age), wherein W1, W2, W3, W4, and W5 are weightages selected by a user.

The IHS may calculate the performant age using the formula: Performant Age=Refresh Cycle Duration−Real Age.

The computer-readable instructions may further cause the processor to: display a visual indication of performant age on the physical IHS. The visual indication of performant age may be a light on a panel of a server.

The computer-readable instructions may further cause the processor to: display a visual indication of performant age on a management console user interface and/or generate a report identifying a chronological age and the performant age for each of a group of servers.

BRIEF DESCRIPTION OF THE DRAWINGS

Figure 1:
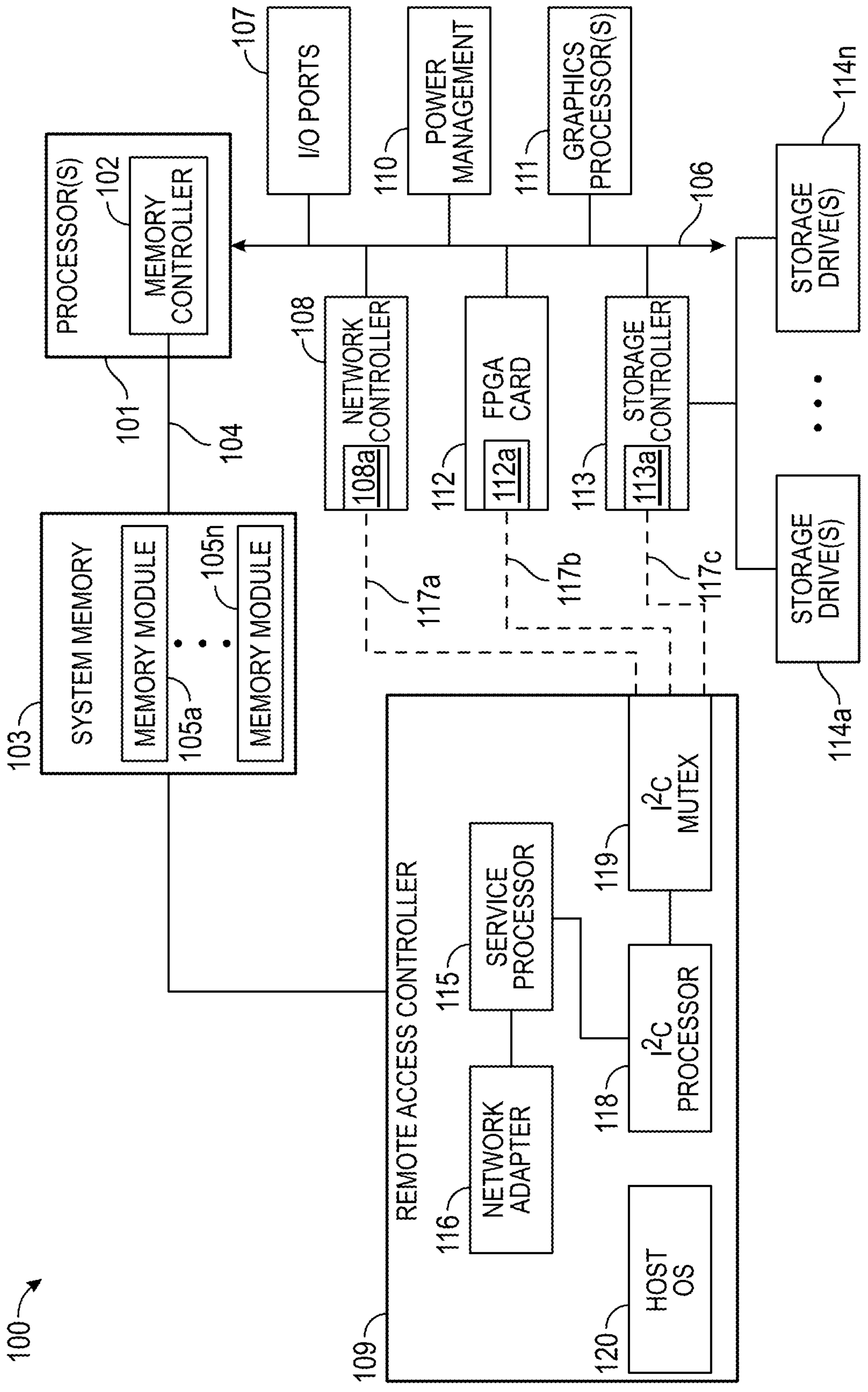

Having thus described the invention in general terms, reference will now be made to the accompanying drawings, which are not necessarily drawn to scale, and wherein:

FIG. 1 illustrates an example Information Handling System (IHS) configured to implement the systems and methods for evaluating the operational age of data center equipment as described herein.

Figure 2:
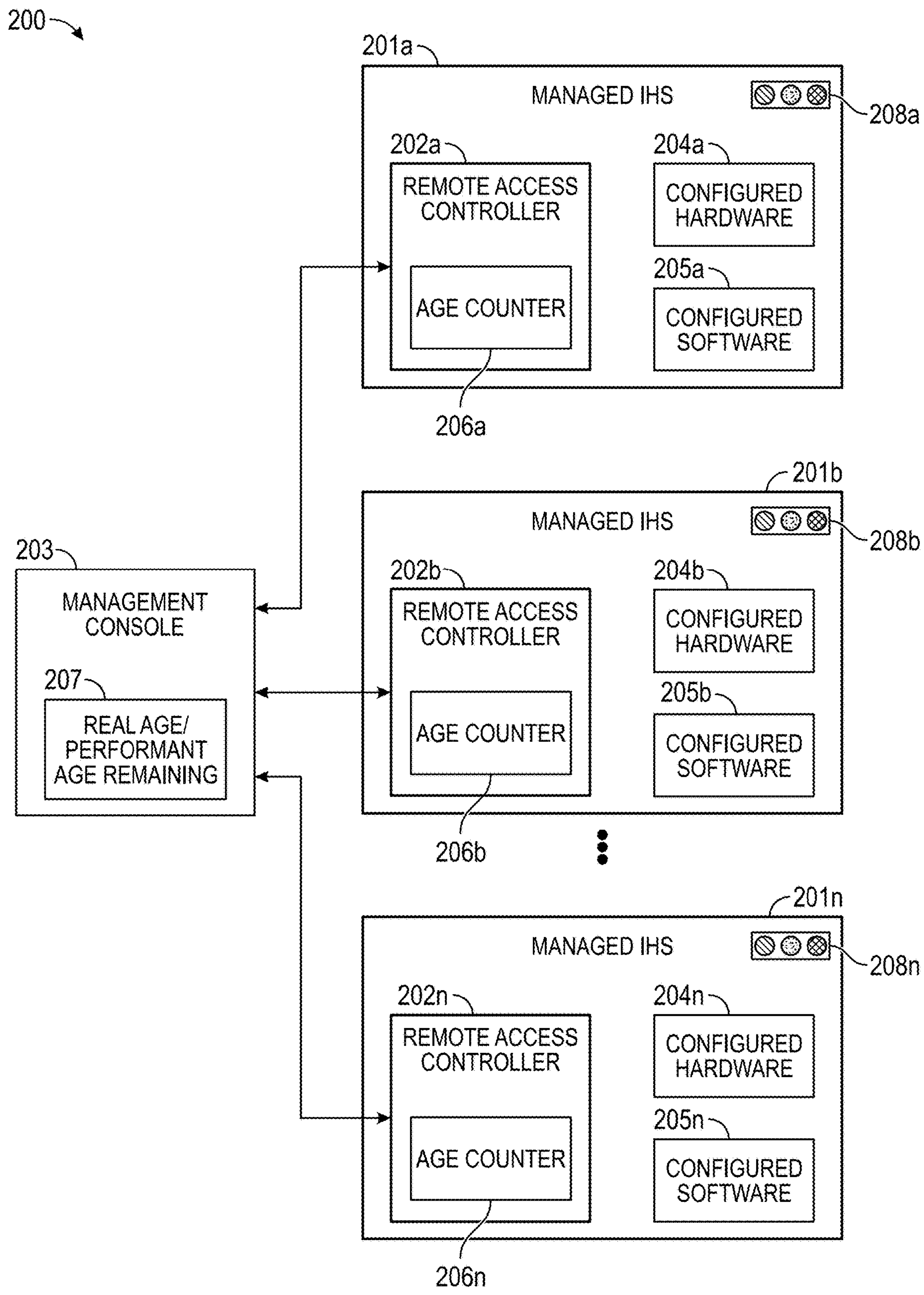

FIG. 2 is a block diagram depicting certain components of a system that may be configured for determining the "real age" and the "performant age remaining" of a plurality of managed IHSs.

Figure 3:
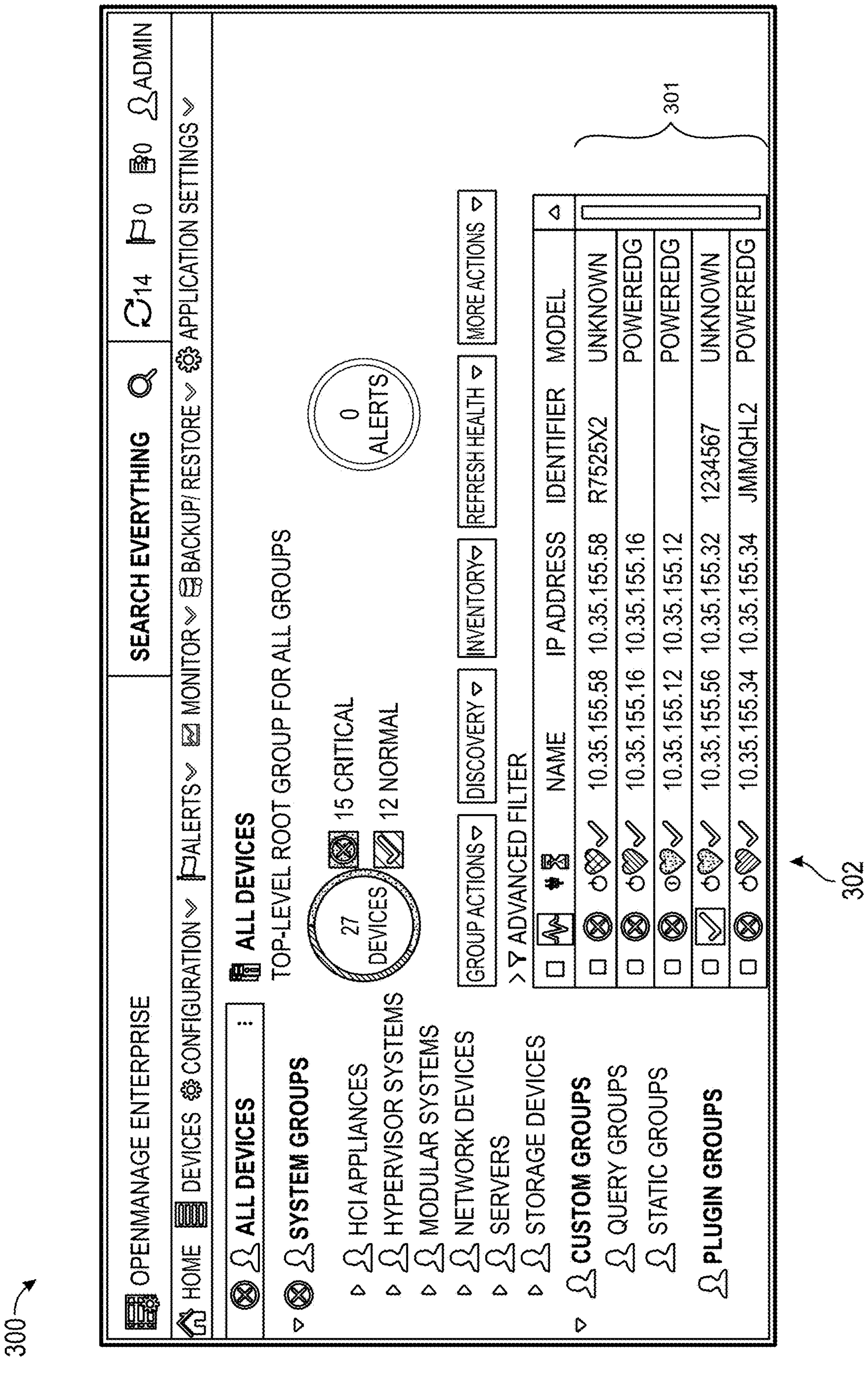

FIG. 3 illustrates a user interface display for a management console showing an administrator the current performant age for devices in a data center.

Figure 4:
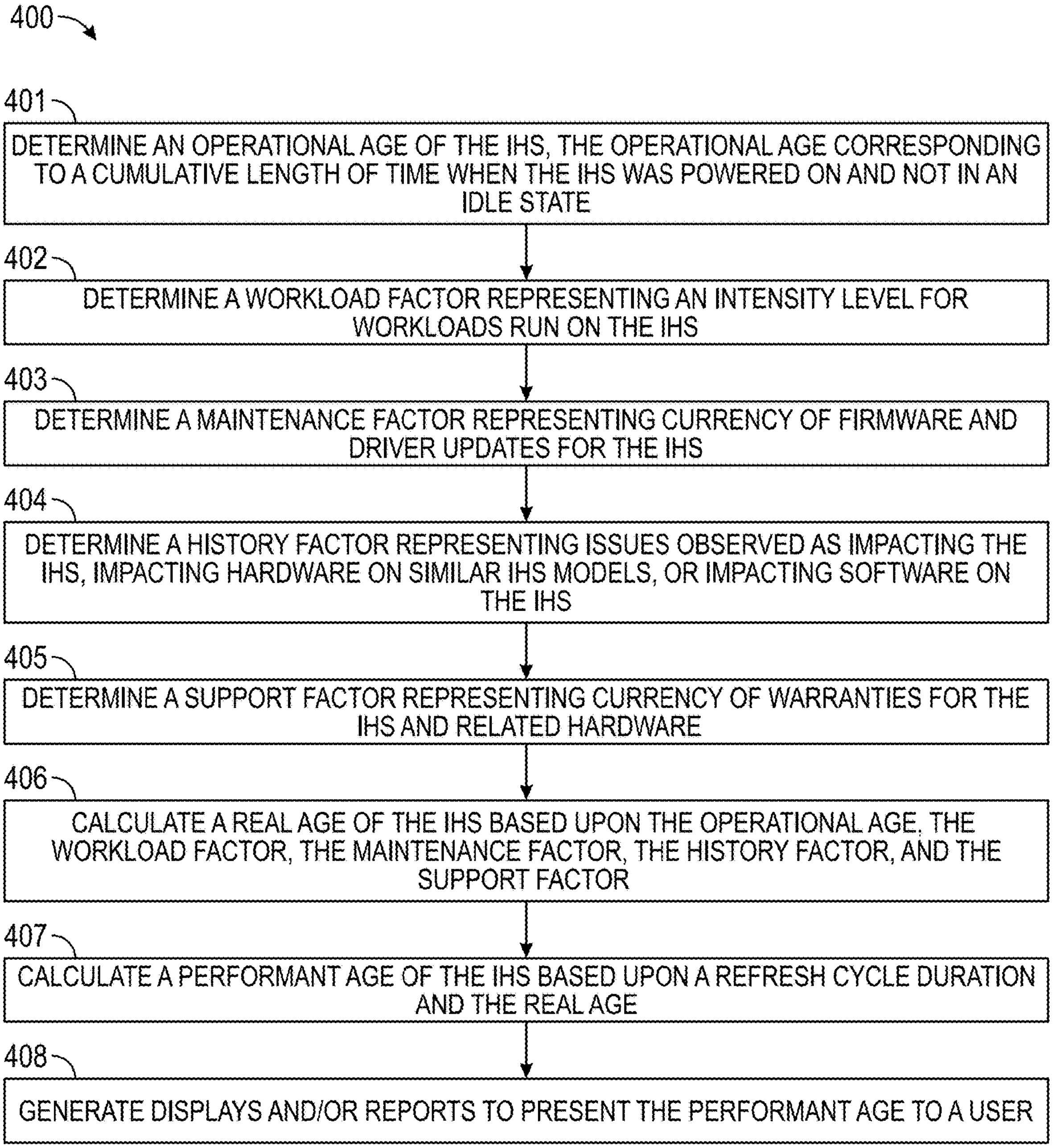

FIG. 4 shows a flowchart illustrating an example process for evaluating the effective age of an Information Handling System.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

A common problem faced by systems administrators and data center personnel is identifying which existing systems should be replaced with new ones when the time arises to refresh equipment. Typically, systems management applications monitor system health and manage tasks executing on data center servers; however, there is not a convenient way to identify which of the monitored equipment are best candidates for refresh or replacement at the next opportunity. In the way that human chronological age may not accurately reflect a person's biological age, the chronological age of equipment may not match actual cumulative usage of the equipment. Accordingly, age alone may not be a good measure of performant age remaining for data center equipment. As used herein, the term "performant age" refers the remaining time that a system or piece of equipment is expected to operate before being replaced.

With servers or other computer equipment, there is no existing system that enables a fair identification of how "old" a server may be. This gives rise to a problem that many administrators face-how to identify the "best" candidates for replacement during hardware refresh cycles. Ideally, administrators would want to identify systems for replacement based on how much longer the systems can reliably be used.

FIG. 1 illustrates an example Information Handling System (IHS) 100 configured to implement the systems and methods described herein. It should be appreciated that although the embodiments described herein may describe an IHS that is a compute sled or similar computing component that may be deployed within the bays of a chassis, other embodiments may be utilized with other types of IHSs.

IHS 100 may be a compute sled that is installed within a large system of similarly configured IHSs that may be housed within the same chassis, rack and/or data center. IHS 100 may utilize one or more processors 101. In some embodiments, processors 101 may include a main processor and a co-processor, each of which may include a plurality of processing cores that, in certain scenarios, may each be used to run an instance of a server process. In certain embodiments, one, some or all processor 101 may be graphics processing units (GPUs). In some embodiments, one, some or all processor 101 may be specialized processors, such as artificial intelligence processors or processor adapted to support high-throughput parallel processing computations. As described, such specialized adaptations of IHS 100 may be used to implement specific computing solutions supported by the chassis in which IHS 100 is installed.

As illustrated, processor 101 includes an integrated memory controller 102 that may be implemented directly within the circuitry of the processor 101, or memory controller 102 may be a separate integrated circuit that is located on the same die as the processor 101. Memory controller 102 may be configured to manage the transfer of data to and from a system memory 103 of the IHS 101 via a high-speed memory interface 104.

System memory 103 is coupled to processor 101 via a memory bus 104 that provides the processor 101 with high-speed memory used in the execution of computer program instructions by the processor 101. Accordingly, system memory 103 may include memory components, such as static RAM (SRAM), dynamic RAM (DRAM), or NAND Flash memory, suitable for supporting high-speed memory operations by the processor 101. In certain embodiments, system memory 103 may combine both persistent, non-volatile memory, and volatile memory.

In certain embodiments, system memory 103 may be comprised of multiple removable memory modules. System memory 103 in the illustrated embodiment includes removable memory modules 105*a-n*. Each of the removable memory modules 105*a-n* may correspond to a printed circuit board memory socket that receives a removable memory module 105*a-n*, such as a DIMM (Dual In-line Memory Module), that can be coupled to the socket and then decoupled from the socket as needed, such as to upgrade memory capabilities or to replace faulty components. Other embodiments of IHS system memory 103 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 100 may utilize a chipset that may be implemented by integrated circuits that are connected to each processor 101. All or portions of the chipset may be implemented directly within the integrated circuitry of an individual processor 101. The chipset may provide the processor 101 with access to a variety of resources accessible via one or more buses 106. Various embodiments may utilize any number of buses to provide the illustrated pathways served by bus 106. In certain embodiments, bus 106 may include a PCIe (PCI Express) switch fabric that is accessed via a PCIe root complex. IHS 100 may also include one or more I/O ports 107, such as PCIe ports, that may be used to couple the IHS 100 directly to other IHSs, storage resources or other peripheral components. In certain embodiments, the I/O ports 107 may provide couplings to the backplane of the chassis in which the IHS 100 is installed.

As illustrated, a variety of resources may be coupled to the processor 101 of the IHS 100 via bus 106. For instance, processor 101 may be coupled to a network controller 108, such as provided by a Network Interface Controller (NIC) that is coupled to the IHS 100 and allows the IHS 100 to communicate via an external network, such as the Internet or a LAN. As illustrated, network controller 108 may report information to a remote access controller 109 via an out-of-band signaling pathway that is independent of the operating system of the IHS 100.

Processor 101 may also be coupled to a power management unit 110 that may interface with a power system unit of a chassis in which an IHS 100 may be installed, such as a compute sled. In certain embodiments, a graphics processor 111 may be comprised within one or more video or graphics cards, or an embedded controller, installed as components of IHS 100. In certain embodiments, graphics processor 111 may be an integrated of the remote access controller 109 and may be utilized to support the display of diagnostic and administrative interfaces related to IHS 100 via display devices that are coupled, either directly or remotely, to remote access controller 109.

As illustrated, IHS 100 may include one or more FPGA (Field-Programmable Gate Array) card(s) 112. Each of the FPGA cards 112 supported by IHS 100 may include various processing and memory resources, in addition to an FPGA integrated circuit that may be reconfigured after deployment of IHS 100 through programming functions supported by FPGA card 112. Each individual FGPA card 112 may be optimized to perform specific processing tasks, such as specific signal processing, security, data mining, and artificial intelligence functions, and/or to support specific hardware coupled to IHS 100. In certain embodiments, such specialized functions supported by an FPGA card 112 may be utilized by IHS 100 in support of certain computing solutions. As illustrated, FPGA 112 may report information to the remote access controller 109 via an out-of-band signaling pathway that is independent of the operating system of the IHS 100.

IHS 100 may also support one or more storage controllers 113 that may be utilized to provide access to virtual storage configurations. For instance, storage controller 113 may provide support for RAID (Redundant Array of Independent Disks) configurations of storage devices 114*a-n*, such as storage drives provided by storage sleds. In some embodiments, storage controller 113 may be an HBA (Host Bus Adapter). Storage controller 113 may report information to the remote access controller 109 via an out-of-band signaling pathway that is independent of the operating system of the IHS 100.

In certain embodiments, IHS 100 may operate using a BIOS (Basic Input/Output System) that may be stored in a non-volatile memory accessible by the processor(s) 101. The BIOS may provide an abstraction layer by which the operating system of the IHS 100 interfaces with the hardware components of the IHS. Upon powering or restarting IHS 100, processor 101 may utilize BIOS instructions to initialize and test hardware components coupled to the IHS, including both components permanently installed as components of the motherboard of IHS 100, and removable components installed within various expansion slots supported by the IHS 100. The BIOS instructions may also load an operating system for use by the IHS 100. In certain embodiments, IHS 100 may utilize Unified Extensible Firmware Interface (UEFI) in addition to or instead of a BIOS. In certain embodiments, the functions provided by a BIOS may be implemented, in full or in part, by the remote access controller 109.

In certain embodiments, remote access controller 109 may operate from a different power plane from the processors 101 and other components of IHS 100, thus allowing the remote access controller 109 to operate, and management tasks to proceed, while the processing cores of IHS 100 are powered off. As described, various functions provided by the BIOS, including launching the operating system of the IHS 100, may be implemented by the remote access controller 109. In some embodiments, the remote access controller 109 may perform various functions to verify the integrity of the IHS 100 and its hardware components prior to initialization of the IHS 100 (i.e., in a bare-metal state).

Remote access controller 109 may include a service processor 115, or specialized microcontroller, that operates management software that supports remote monitoring and administration of IHS 100. Remote access controller 109 may be installed on the motherboard of IHS 100 or may be coupled to IHS 100 via an expansion slot provided by the motherboard. In support of remote monitoring functions, network adapter 116 may support connections with remote access controller 109 using wired and/or wireless network connections via a variety of network technologies.

In some embodiments, remote access controller 109 may support monitoring and administration of various devices 108, 112, 113 of an IHS via a sideband interface. In such embodiments, the messages in support of the monitoring and management function may be implemented using MCTP (Management Component Transport Protocol) that may be transmitted using I2C sideband bus connections 117*a-c* established with each of the respective managed devices 108, 112, 113. As illustrated, the managed hardware components of the IHS 100, such as FPGA cards 112, network controller 108 and storage controller 113, are coupled to the IHS processor 101 via an in-line bus 106, such as a PCIe root complex, that is separate from the I2C sideband bus connection 117*a-c*.

In certain embodiments, the service processor 115 of remote access controller 109 may rely on an I2C co-processor 118 to implement sideband I2C communications between the remote access controller 109 and managed components 108, 112, 113 of the IHS. The I2C co-processor 118 may be a specialized co-processor or micro-controller that is configured to interface via a sideband I2C bus interface with the managed hardware components 108, 112, 113 of IHS. In some embodiments, the I2C co-processor 118 may be an integrated component of the service processor 115, such as a peripheral system-on-chip feature that may be provided by the service processor 115. Each I2C bus 117*a-c* is illustrated as single line in FIG. 1. However, each I2C bus 117*a-c* may be comprised of a clock line and data line that couple the remote access controller 109 to I2C endpoints 108*a*, 112*a*, 113*a*.

As illustrated, the I2C co-processor 118 may interface with the individual managed devices 108, 112, and 113 via individual sideband I2C buses 117*a-c* selected through the operation of an I2C multiplexer 119. Via switching operations by the I2C multiplexer 119, a sideband bus connection 117*a-c* may be established by a direct coupling between the I2C co-processor 118 and an individual managed device 108, 112, or 113.

In providing sideband management capabilities, the I2C co-processor 118 may each interoperate with corresponding endpoint I2C controllers 108*a*, 112*a*, 113*a* that implement the I2C communications of the respective managed devices 108, 112, 113. The endpoint I2C controllers 108*a*, 112*a*, 113*a* may be implemented as a dedicated microcontroller for communicating sideband I2C messages with the remote access controller 109, or endpoint I2C controllers 108*a*, 112*a*, 113*a* may be integrated SoC functions of a processor of the respective managed device endpoints 108, 112, 113.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor 101 as a systems-on-a-chip.

In some embodiments, the remote access controller 109 may include or may be part of a baseboard management controller (BMC). As a non-limiting example of a remote access controller 109, the integrated Dell Remote Access Controller (iDRAC) from Dell® is embedded within Dell PowerEdge™ servers and provides functionality that helps information technology (IT) administrators deploy, update, monitor, and maintain servers remotely. In other embodiments, a chassis management controller may include or may be an integral part of a baseboard management controller. Remote access controller 109 may be used to monitor, and in some cases manage computer hardware components of IHS 100. Remote access controller 109 may be programmed using a firmware stack that configures remote access controller 109 for performing out-of-band (e.g., external to a computer's operating system or BIOS) hardware management tasks. Remote access controller 109 may run a host operating system (OS) 120 on which various agents execute. The agents may include, for example, a service module that is suitable to interface with remote access controller 109 including, but not limited to, an iDRAC service module (iSM).

FIG. 2 is a block diagram depicting certain components of a system 200 that may be configured for determining the "real age" and the "performant age remaining" of a plurality of managed IHSs 201*a-n*. As described with regard to FIG. 1, each managed IHS 201*a-n*, such as servers in a data center, may include a remote access controller 202*a-n* by which various aspects of IHSs 201*a-n* are remotely monitored and administered. In certain embodiments, the remote access controllers 202*a-n* of managed IHS 201*a-n* may communicate with a management console 203 in determining the real age and the performant age remaining in the managed IHSs 201*a-n*. As described, the operations of remote access controllers 202*a-n* may be external to the operating system of a managed IHS 201*a-n*, thus allowing the real age and the performant age remaining to be monitored and determined without the operating system of IHS 201*a-n*.

As described, determining the real age and the performant age remaining of devices within a network of managed IHSs 201*a-n* may utilize a management console 203 that is configured to determine the configuration parameters of the managed IHSs 201*a-n*. In certain instances, each of the managed IHSs 201*a-n* may include identical, or nearly identical, hardware and software such that each of the managed IHSs 201*a-n* may be configured identically and may execute similar workloads, such as a group of IHS in a single rack. In such instances, management console 203 may generate a real age and performant age remaining that applies to each of the managed IHSs 201*a-n*. In other instances, the real ages and performant ages remaining for a group of managed IHSs 201*a-n* may vary based on the respective date of first install or boot-up and the workloads assigned to individual managed IHSs 201*a-n* as well as the hardware 204*a-n* and software 205*a-n* configurations of individual IHSs 201*a-n*. In such instances, management console 203 may generate different real ages and performant ages remaining for each of the managed IHSs 201*a-n*.

The measure of the age of a server (e.g., an IHS 201*a-n* or other machine) is based on a few factors:

Chronological age of the server. This corresponds to chronological age of living organisms. Once a server 201*a-n* boots securely for the first time in the customer environment, a counter 206*a-n* in the firmware records the elapsed time. In some embodiments, server firmware will need to be enhanced to support a counter 206*a-n* that records this elapsed time.

Operational age of the server. While a server 201*a-n* is installed at the customer's datacenter, there are times when it is not powered on or is in an idle state. Server 201*a-n* firmware has the notion of "up time" that indicates the amount of time that the server has been operational since the last power on. The operational age of a server corresponds to the "cumulative uptime" since the server first boots up in the customer's environment.

How heavily the server is used. Some server components experience wear over time and use, such as a limited number of writes on Serial Peripheral Interface (SPI) flash and hard disk drive (HDD). The types of workloads running on the server and the intensity of these workloads determine how heavily server 201*a-n* is used. Various types of workloads can impact the temperature and cooling requirements for the system. Insufficient cooling can reduce the overall life expectancy of the server 201*a-n*. Factors such as central processing unit (CPU) intensive use, memory intensive use, input/output (I/O) device access, high-performance computing (HPC), operation in a cluster, and running artificial intelligence (AI), machine learning (ML), and/or business applications contribute to how heavily a server is being used.

How well the server has been maintained. This factor depends on whether the customer keeps the system up-to-date in terms of firmware and driver updates and whether the hardware manufacturer continues to provide refreshes for firmware and drivers on the equipment. Another aspect of maintenance is parts replacement on the system. The server firmware tracks this by adding parts replacement messages to server lifecycle logs. A system with replaced parts and up-to-date firmware and drivers will be more performant than a system that has not been updated at all.

Previous problems encountered. This factor relates to any historical observation of issues that impacted the system, which may be either systemic or environmental, and if those issues have been successfully resolved. This factor may be supplemented by community knowledge of issues affecting this server model, problems with the installed hardware components, security vulnerabilities for systems running the same operating system or applications, etc. A system with outstanding issues or with latent issues observed on similar machines is likely to be less performant than a system without any known issues.

Support in place. This factor relates to the availability of active warranties. It is a positive feature if the system has active support warranties or active maintenance programs either from the hardware vendor or via a third party.

The management console 203 may determine the real age and the performant age remaining 207 for the managed IHSs 201*a-n*. For instance, management console 203 may track configuration parameters and assigned workloads that relate to age and usage of the managed IHSs 201*a-n*. Alternatively, the individual servers 201*a-n* may track their own real age and performant age remaining and may transmit such information to the management console 203. Each of the remote access controllers 202*a-n* may periodically, or based on a request from the management console 203, send its own real age and performant age remaining calculations to management console 203. Alternatively, the remote access controllers 202*a-n* may periodically send server 201*a-n* configuration information to allow management console 203 to make real age and performant age remaining calculations.

In one embodiment, the "real age" of a system is computed as:

$$\text{Real Age} = (0.75 * \text{Operational Age}) + (0.10 * \text{Workload Factor} * \text{Operational Age}) + (0.05 * \text{Maintenance Factor} * \text{Operational Age}) + (0.05 * \text{History Factor} * \text{Operational Age}) + (0.05 * \text{Support Factor} * \text{Operational Age}),$$

where Operational Age is the cumulative "up time" discussed above.

The weightages and the factor values may be suggested defaults. A data center administrator have be able to override the default values with customer desired weightages, thereby making the calculation of "real age" customizable. If customer adjustments are provisioned, then only reasonable values should be allowed (e.g., customer adjustments are allowed within a defined range).

The factors as defined for an example embodiment are shown in Table 1.

TABLE 1

| Factor | Value |
| --- | --- |
| Workload Factor | Intensive workloads = 1<br>Medium workloads = 0.5<br>Low workloads = 0.25 |
| Maintenance Factor | Never updated = 1<br>Updates 1-2 levels away from recommended levels = 0.6<br>Current updates = 0.1 |
| History Factor | Any issues encountered on the system = 1<br>Hardware issues on similar models = 0.5<br>Common Vulnerabilities and Exposures (CVEs) affecting any software components on the system = 1 |
| Support Factor | No active warranties = 1<br>Warranties expiring in 60 days = 0.8<br>Current warranties = 0.1 |

In one embodiment, the "performant age" of a system is computed as:

$$\text{Performant Age} = \text{Refresh Cycle Duration (in days)} - \text{Real Age (in days)}.$$

Accordingly, if an example customer's hardware refresh cycle is once every seven years, then the "performant age" left could be calculated as:

$$\text{Performant Age} = \text{Refresh Cycle Duration (in days)} - \text{Real Age (in days)} = 7 \text{ years} * 365 \text{ days/year}) - \text{Real Age (in days)}$$

In some embodiments, a visual indication of the age is provided via IHS/server hardware or system software.

On systems 201*a-n* that support front panel LEDs, an age-related LED display 208*a-n* can be used to display remaining service life. In one arrangement, LED display 208*a-n* may show a selected color (e.g., Green/Yellow/Red) depending on the performant age. For example, systems with more than two years of performant age could show Green, systems with one to two years of performant age could show Yellow, and systems with less than one year of performant age can show Red. This would allow a data center administrator to quickly identify server chasses and racks that should be considered for replacement in upcoming system refreshes.

Additionally, or alternatively, the performant age and chronological age of the system can displayed on a user display of a management console. The system age may be available both in a system detailed view and when viewing all of the devices. For example, a performant age indicator can be shown alongside health and connectivity status indicators. The management application may also have a standard report that identifies systems that are closest to replacement. Such reports may also indicate how well the system is being used (i.e., indicate heavy or light use). A data center administrator may use this information, for example, to update the equipment refresh cycle. The refresh cycle may need to be shortened for a data center that has high use and overall lower performant age so that equipment can be replaced faster.

FIG. 3 illustrates a user interface display 300 for a management console. User interface display 300 allows an administrator to see the current status for devices in a data center. Display 300 lists several servers 301 and provides identifying information and other data for each. A performant age icon 302 is included in the information presented for each server. The icon may have different shapes and/or colors that indicate a current performant age of the server. For example, servers with more than two years of performant age could show Green, servers with eighteen to twenty-four months of performant age could show Yellow, servers with twelve to eighteen months of performant age could show Orange, and servers with less than one year of performant age can show Red. This would allow a data center administrator to quickly identify server that should be considered for replacement when the system is next refreshed.

Monitoring the performant age of servers or other data center equipment allows users, such as data center administrators, to determine the benefit of equipment replacement/removal.

A user may be able to reduce a data center's carbon emissions by replacing older servers with newer, more carbon friendly servers. Older machines with heavy use may need to be replaced with newer, more efficient machines. This will reduce the carbon footprint of the data center by lowering the amount of fossil fuel energy required to operate the servers. In some situations, users may show this savings to government entities to receive positive carbon credits.

A user may also reduce operating costs with the power savings that occurs when older servers are replaced with newer, power efficient servers. The power per compute cycle will improve when comparing compute output for newer servers to older servers.

Additionally, newer servers tend to save space with more compute power and more memory storage in less space. This shrinks the physical footprint of the data center as newer servers that can handle consolidated workloads replace older servers. In some cases, two or three old servers may be replaced with one new server.

Manufacturers can also use the server age information. Performant age of customers' servers can be used as input to pre-sales planning tools to allow accurate server age comparisons. Knowing the age of servers still in use allows for planning when to schedule new server releases. Also, server performant age information can be used to assist customers in understanding the potential workload increase that newer servers provide while reducing power and carbon emissions.

The chronological age and performant age of servers may also be used for workload distribution. Applications and workloads that are less impactful can be directed to older servers, while workloads that are long running, compute intensive, business critical, etc. are directed to newer servers with higher performant age.

FIG. 4 shows a flowchart 400 illustrating an example process for evaluating the effective age of an Information Handling System. At 401, an operational age of the IHS is determined. The operational age corresponds to a cumulative length of time when the IHS was powered on and not in an idle state. At 402, a workload factor is determined. The workload factor represents an intensity level for workloads run on the IHS. The workload factor may further represent the type of workloads running on the IHS and the impact of the workloads on cooling requirements for the IHS. At 403, a maintenance factor is determined. The maintenance factor represents currency of firmware and driver updates for the IHS. The maintenance factor may further represent a quality of a parts replacement system for the IHS. At 404, a history factor is determined. The history factor represents issues observed as impacting the IHS, impacting hardware on similar IHS models, or impacting software on the IHS. At 405, a support factor is determined. The support factor represents the currency of warranties for the IHS and related hardware.

At 406, a real age of the IHS is calculated based upon the operational age, the workload factor, the maintenance factor, the history factor, and the support factor. The real age calculation may use the formula:

$$\text{Real Age} = (W1 * \text{Operational Age}) + (W2 * \text{Workload Factor} * \text{Operational Age}) + (W3 * \text{Maintenance Factor} * \text{Operational Age}) + (W4 * \text{History Factor} * \text{Operational Age}) + (W5 * \text{Support Factor} * \text{Operational Age}),$$

wherein W1, W2, W3, W4, and W5 are weightages for each factor. The values of W1, W2, W3, W4, and/or W5 may be set by a user or selected from a predetermined range. In one embodiment, the weightages are set as: W1=0.75, W2=0.10, W3=0.05, W4=0.05, and W5=0.05. Alternatively, the weightages may be customizable so that users can adjust the weightages/factor values associated to various causes or use cases.

At 407, a performant age of the IHS is calculated based upon a refresh cycle duration and the real age calculated at 406. The performant age calculation may use the formula:

$$\text{Performant Age} = \text{Refresh Cycle Duration} - \text{Real Age}.$$

At 408, displays and/or reports are generated to present the performant age to a user. The display may be a visual indication of performant age on the physical IHS, such as a light on a front, side, or back panel of an IHS server. The display may also be a visual indication of performant age on a management console user interface showing a performant age of individual servers or a group of servers. Reports identifying the chronological age and the performant age may be generated for groups of servers, such as servers in a data center. Such reports can be analyzed to determine how well servers are being utilized. This can be factored into budgeting for the data center. This report can also be used to identify systems that could be routed to individual OEM's or server vendor's take back programs to foster circular economy and sustainability.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method for evaluating the effective age of an Information Handling System (IHS), the method comprising:

determine, by a remote access controller configured to operate external to an operating system of the IHS, an operational age of the IHS based at least in part on server firmware configured to determine an IHS uptime indication of an amount of time that the IHS has been operational since a last power on and a counter configured to record elapsed time since a first secure boot of the IHS in a customer environment, the operational age corresponding to a cumulative length of time when the IHS was powered on and not in an idle state;

determine a workload factor representing an intensity level for workloads run on the IHS;

determine a maintenance factor representing currency of firmware and driver updates for the IHS, wherein the maintenance factor is based on parts replacement messages added to server lifecycle logs;

determine a history factor representing issues observed as impacting the IHS, impacting hardware on similar IHS models, or Common Vulnerabilities and Exposures (CVEs) impacting software on the IHS;

determine a support factor representing currency of warranties or maintenance programs for the IHS and related hardware;

calculate a real age of the IHS based upon the operational age, the workload factor, the maintenance factor, the history factor, and the support factor; and periodically send the real age or configuration information for determination of the real age from the remote access controller to a management console.

2. The method of claim 1, further comprising:

calculate a performant age of the IHS based upon a refresh cycle duration and the real age.

3. The method of claim 1, wherein the real age is calculated using the formula:

$$\text{Real Age} = (0.75 * \text{Operational Age}) + (0.10 * \text{Workload Factor} * \text{Operational Age}) + (0.05 * \text{Maintenance Factor} * \text{Operational Age}) + (0.05 * \text{History Factor} * \text{Operational Age}) + (0.05 * \text{Support Factor} * \text{Operational Age}).$$

4. The method of claim 1, wherein the performant age is calculated using the formula:

$$\text{Performant Age} = \text{Refresh Cycle Duration} - \text{Real Age}.$$

5. The method of claim 1, wherein the workload factor further represents a type of workloads running on the IHS and an impact of the workloads on cooling requirements for the IHS.

6. The method of claim 1, wherein the maintenance factor further represents a quality of a parts replacement system for the IHS.

7. The method of claim 1, wherein the real age is calculated using the formula:

$$\text{Real Age} = (W1 * \text{Operational Age}) + (W2 * \text{Workload Factor} * \text{Operational Age}) + (W3 * \text{Maintenance Factor} * \text{Operational Age}) + (W4 * \text{History Factor} * \text{Operational Age}) + (W5 * \text{Support Factor} * \text{Operational Age}).$$

8. The method of claim 7, wherein W1, W2, W3, W4, and W5 are weightages set by a user or are selected by a user from a predetermined range.

9. The method of claim 2, further comprising:

display a visual indication of performant age on the physical IHS.

10. The method of claim 2, wherein the visual indication of performant age is a light on a panel of a server.

11. The method of claim 2, further comprising:

display a visual indication of performant age on a management console user interface.

12. The method of claim 2, further comprising:

generate a report identifying a chronological age and the performant age for each of a group of servers.

13. An Information Handling System (IHS), comprising:

a remote access controller configured to operate external to an operating system of the IHS and from a different power plane than any host processor of the IHS; and computer-readable instructions stored in at least one memory and executed by at least one processor of the remote access controller, wherein the computer-readable instructions cause the processor to:

monitor an operational age of the IHS based at least in part on server firmware configured to determine an IHS uptime indication of an amount of time that the IHS has been operational since a last power on and a counter configured to record elapsed time since a first secure boot of the IHS in a customer environment, the operational age corresponding to a cumulative length of time when the IHS was powered on and not in an idle state;

monitor a workload factor representing an intensity level for workloads run on the IHS;

monitor a maintenance factor representing currency of firmware and driver updates for the IHS, wherein the maintenance factor is based on parts replacement messages added to server lifecycle logs;

determine a history factor representing issues observed as impacting the IHS, impacting hardware on similar IHS models, or Common Vulnerabilities and Exposures (CVEs) impacting software on the IHS;

determine a support factor representing currency of warranties or maintenance programs for the IHS and related hardware;

calculate a real age of the IHS based upon the operational age, the workload factor, the maintenance factor, the history factor, and the support factor;

calculate a performant age of the IHS based upon a refresh cycle duration and the real age; and periodically send the real age, the performant age, or configuration information for determination of the real age or the performant age to a management console.

14. The IHS of claim 13, wherein the real age is calculated using the formula:

$$\text{Real Age} = (W1 * \text{Operational Age}) + (W2 * \text{Workload Factor} * \text{Operational Age}) + (W3 * \text{Maintenance Factor} * \text{Operational Age}) + (W4 * \text{History Factor} * \text{Operational Age}) + (W5 * \text{Support Factor} * \text{Operational Age}).$$

15. The IHS of claim 13, wherein W1, W2, W3, W4, and W5 are weightages selected by a user.

16. The IHS of claim 13, wherein the performant age is calculated using the formula:

$$\text{Performant Age} = \text{Refresh Cycle Duration} - \text{Real Age}.$$

17. The IHS of claim 13, wherein the computer-readable instructions further cause the processor to:

display a visual indication of performant age on the physical IHS.

18. The IHS of claim 17, wherein the visual indication of performant age is a light on a panel of a server.

19. The IHS of claim 13, wherein the computer-readable instructions further cause the processor to:

display a visual indication of performant age on a management console user interface.

20. The IHS of claim 13, wherein the computer-readable instructions further cause the processor to:

generate a report identifying a chronological age and the performant age for each of a group of servers.

* * * * *